US011350653B2

(12) United States Patent
Bullard et al.

(10) Patent No.: US 11,350,653 B2
(45) Date of Patent: Jun. 7, 2022

(54) SPRAY CABINET FOR POULTRY PROCESSING AND METHODS THEREOF

(71) Applicant: ZEE COMPANY, INC., Chattanooga, TN (US)

(72) Inventors: Robert C. Bullard, Signal Mountain, TN (US); Jonathon R. Bullard, Chattanooga, TN (US); James A. Faller, Chattanooga, TN (US); George Beason, Chattanooga, TN (US)

(73) Assignee: Zee Company I, LLC, Chattanooga, TN (US)

( * ) Notice: Subject to any disclaimer, the term of this patent is extended or adjusted under 35 U.S.C. 154(b) by 0 days.

(21) Appl. No.: 16/844,770

(22) Filed: Apr. 9, 2020

(65) Prior Publication Data

US 2020/0323249 A1 Oct. 15, 2020

Related U.S. Application Data

(60) Provisional application No. 62/831,424, filed on Apr. 9, 2019.

(51) Int. Cl.
*A23L 13/50* (2016.01)
*B05B 16/00* (2018.01)
(Continued)

(52) U.S. Cl.
CPC .............. *A23L 13/55* (2016.08); *B05B 7/061* (2013.01); *B05B 16/90* (2018.02); *B08B 3/041* (2013.01); *B08B 3/08* (2013.01); *B05B 14/40* (2018.02)

(58) Field of Classification Search
USPC ......... 118/324, 326, 313–316; 426/332, 335; 452/77
See application file for complete search history.

(56) References Cited

U.S. PATENT DOCUMENTS 2,041,001 A * 5/1936 Knowlton ................ A23B 4/30
                                                      118/684
3,657,768 A * 4/1972 Snowden ............... A22C 21/04
                                                      452/77
(Continued)

FOREIGN PATENT DOCUMENTS

GB            947688        1/1964
WO       WO 99/00025        1/1999
(Continued)

OTHER PUBLICATIONS

Mohan et al. "Role of Peroxyacetic Acid, Octanoic Acid, Malic Acid, and Potassium Lactate on the Microbiological and Instrumental Color Characteristics of Ground Beef", J. Food Science, vol. 77, No. 4, 2012, pp. M188-M193.

(Continued)

*Primary Examiner* — Yewebdar T Tadesse
(74) *Attorney, Agent, or Firm* — DeWitt LLP (57) ABSTRACT

A poultry carcass spraying cabinet having an inclined or declined section located between the entrance and exit, the inclined or declined section having a slope or angle such that the wing-area of adjacently shackled poultry carcasses being conveyed is spaced to increase spray performance of the carcass spraying cabinet, allow foreign material proximate the wing-area of the poultry carcasses to be dislodged, and thereby minimize cross-contamination during poultry processing. The spray nozzles of adjacent arbor members of the inclined or declined section being located in different horizontal planes to provide optimal spraying performance proximate the wing-area of the poultry carcass.

24 Claims, 7 Drawing Sheets

(51) Int. Cl.
  *B05B 7/06* (2006.01)
  *B08B 3/08* (2006.01)
  *B08B 3/04* (2006.01)
  *B05B 14/40* (2018.01)

(56) References Cited

U.S. PATENT DOCUMENTS

| | | | |
|---|---|---|---|
| 4,279,059 A | 7/1981 | Anderson et al. | |
| 5,069,922 A | 12/1991 | Brotsky et al. | |
| 5,143,739 A | 9/1992 | Bender et al. | |
| 5,200,189 A | 4/1993 | Oakes et al. | |
| 5,234,703 A | 8/1993 | Guthery | |
| 5,364,650 A | 11/1994 | Guthery | |
| 5,435,808 A | 7/1995 | Holzhauer et al. | |
| 5,484,332 A | 1/1996 | Leech et al. | |
| 5,489,434 A | 2/1996 | Oakes et al. | |
| 5,632,676 A | 5/1997 | Kurschner et al. | |
| 5,635,231 A | 6/1997 | Bender et al. | |
| 5,882,253 A | 3/1999 | Mostoller | |
| 5,938,519 A | 8/1999 | Wright | |
| 5,939,115 A * | 8/1999 | Kounev | A23B 4/015 426/238 |
| 6,010,729 A | 1/2000 | Gutzmann et al. | |
| 6,103,286 A | 8/2000 | Gutzmann et al. | |
| 6,113,963 A | 9/2000 | Gutzmann et al. | |
| 6,183,807 B1 | 2/2001 | Gutzmann et al. | |
| 6,514,556 B2 | 2/2003 | Hilgren et al. | |
| 6,545,047 B2 | 4/2003 | Gutzmann et al. | |
| 6,627,593 B2 | 9/2003 | Hei et al. | |
| 6,964,788 B2 | 11/2005 | Phebus et al. | |
| 7,754,670 B2 | 7/2010 | Lange et al. | |
| 7,887,641 B2 | 2/2011 | Man et al. | |
| 8,012,002 B2 | 9/2011 | Brown | |
| 8,020,520 B2 | 9/2011 | Hilgren et al. | |
| 8,029,693 B2 | 10/2011 | Dada et al. | |
| 8,030,351 B2 | 10/2011 | Gutzmann et al. | |
| 8,043,650 B2 | 10/2011 | Gutzmann et al. | |
| 8,128,976 B2 | 3/2012 | Man et al. | |
| 8,246,429 B2 | 8/2012 | Hilgren et al. | |
| 8,684,799 B2 | 4/2014 | Brink et al. | |
| 2003/0211169 A1 | 11/2003 | Tabasso | |
| 2006/0113506 A1 | 6/2006 | Man et al. | |
| 2009/0043123 A1 | 2/2009 | Copenhafer et al. | |
| 2009/0145859 A1 | 6/2009 | Man et al. | |
| 2010/0196503 A1 | 8/2010 | Heisig et al. | |
| 2010/0227000 A1 | 9/2010 | Ames et al. | |
| 2011/0027383 A1 | 2/2011 | Hilgren et al. | |
| 2011/0135534 A1 | 6/2011 | Bates et al. | |
| 2011/0177145 A1 | 7/2011 | Erkenbrecher, Jr. et al. | |
| 2011/0220155 A1 | 9/2011 | Man et al. | |
| 2011/0305805 A1 | 12/2011 | Gutzmann et al. | |
| 2011/0311691 A1 | 12/2011 | Gutzmann et al. | |
| 2012/0244261 A1 | 9/2012 | Harvey et al. | |
| 2012/0245228 A1 | 9/2012 | Harvey et al. | |
| 2017/0013849 A1* | 1/2017 | Thippareddi | A23B 5/015 |

FOREIGN PATENT DOCUMENTS

| | | |
|---|---|---|
| WO | WO 02/054866 A1 | 7/2002 |
| WO | WO 2009/027857 A1 | 3/2009 |

OTHER PUBLICATIONS

Quilo et al., "Microbial, instrumental color and sensory characteristics of inoculated ground beef produced using potassium lactate, sodium metasilicate or peroxyacetic acid as multiple antimicrobial interventions", Meat Science, 84, 2010, pp. 470-476.

Harris et al., "Microbiological and organoleptic characteristics of beef trim and ground beef treated with acetic acid, lactic acid, acidified sodium chlorite, or sterile water in a simulated commercial processing environment to reduce *Escherichia coli* O157:H7 and *Salmonella*", Meat Science, 90, 2012, pp. 783-788.

Bell, "Reduction of doodborne mirco-organisms on beef carcass tissue using acetic acid, sodium bicarbonate, and hydrogen peroxide spray washes", Food Microbiology (1997), 14, 439-448.

Labadie, "Development of a New Technique for Obtaining Axenic Meat", European J. Appl. Microbiol. (1977), 4, 67-73.

Gusev, "Peracetic Acid for *Salmonella* Decontamination in Poultry Carcasses", Veterinary Disease Control Review (2007), 4 pages.

Dorn, "Examination of *Salmonella* Decontamination of Broiler Carcasses", (1988), 28 pages.

James et al., "Meat Decontamination", University of Bristol (1997), pp. 1, 8-9, 12, 33-35, 38, 43, 64-91, 98-99 and 104-105.

* cited by examiner

SPRAY CABINET FOR POULTRY PROCESSING AND METHODS THEREOF

CROSS-REFERENCE TO RELATED APPLICATIONS

The present application claims the benefit of U.S. Provisional Application No. 62/831,424 filed Apr. 9, 2019, which is hereby incorporated herein in its entirety by reference.

TECHNICAL FIELD

The present invention is generally directed to the field of poultry processing. More specifically, the present invention is directed to a poultry carcass spray cabinet and related methods of operation that minimizes cross-contamination and improves removal of foreign material from the poultry carcass, particularly removal of foreign material in the wing-area of the poultry carcass, as compared to conventional systems.

BACKGROUND

The world population has grown to a point where mass production of the foods that we consume is no longer a luxury but a requirement. Local farmers, providing food and food products directly to the marketplace, cannot meet the demands of modern society. The food supply chain now incorporates very large, complex farms and high speed and very high-volume processing plants to satisfy the need for mass processing and production of food. Maintaining a safe food supply chain relies on the dedication of those working in the supply chain, the processing plants and also on the third-party oversight of various federal agencies whose regulations support and mandate food safety.

With two major exceptions, the physical process of taking an animal from the farm to the consumer has changed very little over time. The introduction of refrigeration, and the implementation of various chemistries to help maintain sanitary conditions and to control microbiology, has given modern food processors an advantage not enjoyed by food producers of a century ago. Refrigeration and chemical intervention practices have become an integral part of food processing facility operations. These technologies have enabled the high speed, high volume output of the large processing facilities that could not have been possible in times past without significant concern for consumer safety. With large scale and continuous processing methods being employed by large processors of protein food products, or any other material or food product that is susceptible to microbiological contamination, the concern for the control of microbiology and the safety of the food supply chain is of paramount importance.

Another concern, as the demand for food products increases, is the impact on natural resources created by this demand. The ecological impact is directly affected by this growth and therefore new processes must be developed to reduce the impact any given process has on the environment. The ecological impact that a food processing plant has on the environment is no longer a passing concern but a major part of operations and planning. Entire processes are built around the control and conservation of natural resources such as water. Older, outdated and less efficient processes are being replaced at significant cost with more efficient and less wasteful processes that maximizes the utility of available resources. No longer can a plant operate without concern for the conservation and sustainability of natural resources.

Still another concern in slaughtering and processing plants is unwanted microorganisms that are emitted into the air or are contained on the animal carcass when the animal is processed, such as poultry (i.e., turkey, duck and chicken) during shackling, killing/slaughtering, bleeding, scalding, picking, evisceration, cleaning, chilling, and packaging steps. The microorganisms that may become airborne or contained on the animal carcass are unwanted in the processing and packing areas of the plant because they can affect product quality and safety. They also pose a potential threat to the health and well-being of the workers in the plant. Still further, such microorganisms can affect downstream processes in a processing plant, posing quality and safety concerns to the ultimate consumer of the poultry product. Therefore, each step requires careful control of contamination to prevent cross-contamination, prevent spoilage, and possibly illness from subsequent consumption.

Due to its very nature, the process of evisceration of a poultry carcass exposes the exterior body surfaces and inner body cavities of the birds to contents of digestive and intestinal tracts. As a result, the evisceration process can cause excrement, blood clots, or other pathogen-laden particular matter to deposit and become attached to the carcass, and in particular, to surface fat layers, tissue, and feather follicles. Consequently, immediately after the evisceration step, levels of bacteria and other pathogens on the surface of the carcass typically increase relative to pre-evisceration levels.

To ensure that the food supply chain in modern society is maintained at the highest levels of safety for the consumer, very innovative approaches to the systems and methods used in processing facilities have been implemented. For example, large scale refrigeration systems, used to help control microbial growth in various processing applications, have helped the food processing industry to remain in compliance with food safety goals. Refrigeration applications and processes are implemented at various locations in the processing operation to ensure maximization of microbiology control and shelf life. In industrial processing of poultry, for example, immediately after slaughter, bleed out, hot water immersion, feather removal and viscera withdrawal, poultry carcasses have to be chilled to reduce their temperature from approximately 40° C. to 4° C., which contributes to food safety and is typically done by air chilling or immersion chilling.

Poultry carcasses may be subjected to other processes both prior to and after the chilling stage to lower the total microbial load on the birds, including dip tank and spraying processes. There are several antimicrobials that are approved and effective for use in the poultry process (e.g., immersion chiller, dip tank and spraying processes) to decrease pathogens, including, for instance, chlorine, peroxyacetic acid ("PAA"), CPC, organic acids, TSP, acidified sodium chlorite and chlorine dioxide. Because chiller tanks are often quite voluminous, the amount of antimicrobials needed can be quite high to provide a desired $\log_{10}$ reduction in the amount of any unwanted microorganisms.

Despite the use of antimicrobials, poultry carcasses are still subject to cross-contamination due to their relative closeness to each. For example, in industrial processing of poultry, a conveyor having an overhead track often extends between each station along the processing system with each bird hung from a yoke having a shackle bar attached to the conveyor track and a shackle that is attached to the shackle bar grips the poultry carcass proximate the knuckle of each thigh. The poultry carcasses are hung from the track so that the vent of each carcass is oriented upwardly to permit spraying of an antimicrobial solution or the like into the carcass cavities as well as onto the surfaces of the carcasses during the cleaning operation. But during this process, adjacent carcasses are often hung close enough to each other that contact between each poultry carcass is common. The wings of adjacent poultry carcasses can also interlock as they are conveyed along the process. Because the wing-area is difficult to clean due to the interlocking of the wings, the crevices around the wing-area, and the like, the potential for foreign matter to be transmitted from one poultry carcass to another poultry carcass still remains an issue.

As such, there is a need in the industry to efficiently, cost-effectively and safely process poultry carcasses and to minimize cross-contamination during the processing operation.

SUMMARY

Carcass spray cabinets of the present invention and their related methods of operation improve upon conventional cabinets by creating a separation of adjacent poultry carcasses to offer better spray performance and thus minimize cross-contamination and generating less waste. In some aspects, the wing-area of adjacent poultry carcasses are separated in a horizontal direction to minimize cross-contamination while also increasing spray performance of an antimicrobial solution applied to the poultry carcass.

In some aspects, the whole carcass spray cabinet comprises a housing structure having an entrance and an exit, a conveyor for conveying poultry carcasses hanging from shackles through the housing from the entrance to the exit, at least two arbor members located within the housing between the entrance and the exit, each arbor member having one or more wing-spray nozzles attached thereto and capable of being in fluid communication with an antimicrobial solution, wherein the housing has an inclined section or a declined section between the entrance and the exit, wherein the inclined and/or declined section spaces the wing-area of adjacent poultry carcasses hanging from adjacent shackles on the conveyor in a horizontal direction. In some aspects, the wing-spray nozzles of adjacent arbor members within the inclined or declined section are located in different planes relating to the spaced wing-area of adjacent poultry carcasses hanging from adjacent shackles on the conveyor, wherein the spaced wing-spray nozzles helps minimize cross-contamination and increase spray performance of the antimicrobial solution applied to the poultry carcass.

In some aspects, the housing structure comprises at least two sides and a bottom drip pan. In some aspects, the housing structure also comprises a top portion with the conveyor located within the housing structure under the top portion. In some aspects, the bottom drip pan extends the entire distance of the housing structure.

In some aspects, the spray cabinet of the present invention comprises at least two spray arbor sections proximately located the inclined or declined section, wherein each arbor section comprises two opposing arbor members such that the conveyor is configured to convey the shackles between the two opposing arbors. In some aspects, the inclined or declined section comprises a plurality of arbor sections, each arbor section having two opposing arbor members.

In some aspects, the plurality of arbor members proximate the inclined or declined section each have at least two wing-spray nozzles that are configured to spray an antimicrobial solution at the wing-area of a poultry carcass hanging from the shackle.

In some aspects, each arbor member proximate the inclined or declined section has a first wing-spray nozzle that is configured to spray an antimicrobial solution at the wing-area of a poultry carcass prior to the shackle being proximately located between the opposing arbor members during the conveying process from the entrance to the exit of the housing and a second wing-spray nozzle that is configured to spray an antimicrobial solution at the wing-area of a poultry carcass after the shackle being proximately located between the opposing arbor members during the conveying process from the entrance to the exit of the housing.

In some aspects, each arbor member has at least a first wing-spray nozzle and a second wing-spray nozzle, the first and second wing-spray nozzles configured to spray an antimicrobial solution at the wing-area of a poultry carcass hanging from the shackle, the first wing-spray nozzle configured to spray the wing-area of the poultry carcass as it approaches the arbor member during normal operation and is proximately located the arbor member, and the second wing-spray nozzle configured to spray the wing-area of the poultry carcass proximately located the arbor member and as it departs from the arbor member during normal operation.

In some aspects, the first wing-spray nozzle on a first arbor has a first spray pattern and the second wing-spray nozzle on a second adjacent arbor has a second pattern. In some aspects, the first spray pattern and second spray patterns do not overlap. In some other aspects, the first and second spray patterns are configured to at least partially overlap. In some aspects, a top portion of the first spray pattern overlaps with a bottom portion of the second spray pattern. In some aspects, the first and second spray patterns are configured to at least partially overlap the wing-area of the poultry carcass during at least a portion of the conveying process between the entrance and the exit of the housing. In some aspects, the first wing-spray pattern overlaps with the second wing-spray pattern proximate the incline or decline section in an amount between about 1% and about 50%, preferably between about 2% and about 30%, preferably between about 3% and about 25%, preferably between about 4% and about 20%, even more preferably between about 5% and about 15%, proximate the common poultry carcass being located midway between the first and second wing-spray nozzles.

In some other aspects, the first and second wing-spray patterns proximate a horizontal section have between about 80% and about 100% overlap proximate the common poultry carcass being located midway between the first and second wing-spray nozzles.

In some aspects, the first and second wing-spray nozzles on a common arbor member proximate the inclined or declined section are located in different horizontal planes. In some aspects, a horizontal distance between the first and second wing-spray nozzles on the same arbor member proximate the inclined or declined section is between about 0.50 inches and about 18 inches, in some aspects between about 1 inch and about 14 inches, in some aspects between about 2 inches and about 10 inches, in some aspects between about 3 inches and about 8 inches, and in some other aspects between about 4 inches and about 6 inches. In some aspects, the first and second wing-spray nozzles on a common arbor member proximate the inclined or declined section are located in the same horizontal plane, such that an angle of the wing-spray nozzle provides the wing-spray patterns that are in different applied planes.

In some aspects, the first wing-spray nozzles of opposing arbor members proximate the inclined or declined section are in the same horizontal plane. In some aspects, the second wing-spray nozzles of opposing arbor members proximate the inclined or declined section are in the same horizontal plane. In some aspects, the first wing-spray nozzles of opposing arbor members proximate the inclined or declined section are in a different horizontal plane than the second wing-spray nozzles of the common opposing arbor members. In some aspects, the first wing-spray nozzles of opposing arbor members proximate the inclined or declined section are in the same horizontal plane of the second wing-spray nozzles of the common opposing arbor members, such that at least one of the first and second wing-spray nozzles are angled to provide spray patterns in a different horizontal plane.

In some aspects, the spray cabinet of the present invention comprises at least two arbor sections proximately located the inclined or declined section, wherein each arbor section comprises two opposing arbor members, each opposing arbor member having at least a first and second wing-spray nozzle configured to spray an antimicrobial solution at the wing-area of a poultry carcass hanging from the shackle, the first wing-spray nozzle configured to spray the wing-area of the poultry carcass as it approaches the arbor member, and the second wing-spray nozzle configured to spray the wing-area of the poultry carcass as it departs from the arbor member. In some aspects, the first wing-spray nozzle and the second wing-spray nozzle on the same arbor member are located in different horizontal planes. In some aspects, at least the first wing-spray nozzles on the two opposing arbor members are located in substantially the same horizontal plane. In some aspects, the first wing-spray nozzles of the two opposing arbor members are located in a different horizontal plane than the second wing-spray nozzles of the two opposing arbor members. In some aspects, at least the first wing-spray nozzles on adjacent arbor members are located in different horizontal planes. In some aspects, the first wing-spray nozzles on adjacent arbor members are located in different horizontal planes and the second wing-spray nozzles on adjacent arbor members are located in different horizontal planes.

In some aspects, the spray cabinet of the present invention comprises at least two arbor sections proximately located the inclined or declined section, wherein each arbor section comprises two opposing arbor members, each opposing arbor member having a top spray nozzle configured to spray an antimicrobial solution toward the upper portion of the hanging poultry carcass, a bottom spray nozzle configured to spray an antimicrobial solution toward the bottom portion of the hanging poultry carcass, and a wing-spray nozzle located between the top and bottom spray nozzles configured to spray an antimicrobial solution toward the wing-area of the hanging poultry carcass. In some aspects, the top spray nozzle is downwardly directed. In some aspects, the bottom spray nozzle is upwardly directed. In some aspects, the wing-spray nozzle is generally horizontally directed. In some aspects, at least one of the opposing arbor members may also have a cavity-spray nozzle configured to spray an antimicrobial solution toward the cavity section of the hanging poultry carcass. In some aspects, the cavity-spray nozzle is located between the top and bottom spray nozzles. In some aspects, the cavity-spray nozzle is generally horizontally directed.

Through the selection and use of spray nozzles on each arbor member having a desired spray performance on the inclined or declined section, the nozzles are capable of directing the antimicrobial solution in converging fashion to provide total spray coverage of a poultry carcass as it is conveyed through each respective arbor section.

In some aspects, the inclined or declined section has an angle greater than 0 degrees and less than about 60 degrees, in some aspects greater than about 10 degrees and less than about 45 degrees, in some aspects between about 20 degrees and about 40 degrees, and in some preferable aspects between about 25 degrees and about 35 degrees. In some aspects, the angle of the conveyor having shackles spaced at about 4 to about 8 inches, more preferably about 6 inches, at the inclined or declined section is greater than 0 degrees and less than about 60 degrees, in some aspects greater than about 10 degrees and less than about 45 degrees, in some aspects between about 20 degrees and about 40 degrees, and in some preferable aspects between about 25 degrees and about 35 degrees.

In some aspects, the inclined or declined section provides a horizontal distance between the wing-area of adjacent poultry carcasses between about 2 inches and about 2 feet, in some aspects between about 3 inches and about 20 inches, in some aspects between about 4 inches and about 18 inches, in some aspects between about 5 inches and about 16 inches, and in some other aspects between about 6 inches and about 12 inches.

In some aspects, the first wing-spray nozzles on adjacent arbor members proximate the inclined or declined section are located in different horizontal planes. In some aspects, a horizontal distance between the first wing-spray nozzles on adjacent arbor members proximate the inclined or declined section is greater than 0 inches and up to about 2 feet, in some aspects between about 3 inches and about 20 inches, in some aspects between about 4 inches and about 18 inches, in some aspects between about 5 inches and about 16 inches, and in some other aspects between about 6 inches and about 12 inches.

In some aspects, the second wing-spray nozzles on adjacent arbor members proximate the inclined or declined section are located in different horizontal planes. In some aspects, a horizontal distance between the second wing-spray nozzles on adjacent arbor members proximate the inclined or declined section is greater than 0 inches and up to about 2 feet, in some aspects between about 3 inches and about 20 inches, in some aspects between about 4 inches and about 18 inches, in some aspects between about 5 inches and about 16 inches, and in some other aspects between about 6 inches and about 12 inches.

In some aspects, a horizontal distance between the first and second wing-spray nozzles on adjacent arbor members proximate the inclined or declined section is between about 0.50 inches and about 18 inches, in some aspects between about 1 inch and about 14 inches, in some aspects between about 2 inches and about 10 inches, in some aspects between about 3 inches and about 8 inches, and in some other aspects between about 4 inches and about 6 inches.

In some aspects, opposing arbor members are located away from each other a distance between about 6 inches and about 3 feet, in some aspects between about 9 inches and about 2.5 feet, and in some preferable aspects between about 1 foot and about 2 feet.

In some aspects, adjacent arbor members are located away from each other a distance between about 6 inches and about 5 feet, in some aspects between about 9 inches and about 4 feet, and in some preferable aspects between about 12 inches and about 2 feet.

In some aspects, an angle between the first wing-spray nozzles of adjacent arbor members proximate the inclined or declined section is greater than greater than 0 degrees and less than about 60 degrees, in some aspects greater than about 10 degrees and less than about 45 degrees, in some aspects between about 20 degrees and about 40 degrees, and in some preferable aspects between about 25 degrees and about 35 degrees. In some aspects, the angle between the first wing-spray nozzles of adjacent arbor members proximate the inclined or declined section is the same as the angle of the conveyor proximate the inclined or declined section.

In some aspects, an angle between the second wing-spray nozzles proximate the inclined or declined section of adjacent arbors is greater than greater than 0 degrees and less than about 60 degrees, in some aspects greater than about 10 degrees and less than about 45 degrees, in some aspects between about 20 degrees and about 40 degrees, and in some preferable aspects between about 25 degrees and about 35 degrees. In some aspects, the angle between the second wing-spray nozzles of adjacent arbors proximate the inclined or declined section is the same as the angle of the conveyor proximate the inclined or declined section.

In some aspects, the housing comprises an entrance arbor section, an inclined arbor section, and an exit arbor section, the entrance arbor section having at least one wing-spray nozzle on each adjacent arbor member located in approximately the same horizontal plane, the exit arbor having at least one wing-spray nozzle on each adjacent arbor member located in approximately the same horizontal plane, and the inclined or declined arbor section having at least one wing-spray nozzle on each adjacent arbor member located in a different horizontal plane.

In some aspects, the inclined or declined section has a distance that each respective shackle is conveyed between about 3 feet and about 20 feet, in some aspects between about 3.5 feet and about 15 feet, in some aspects between about 4 feet and about 12 feet, and in some aspects between about 5 feet and about 10 feet.

In some aspects, the spray cabinet may comprise two or more inclined or declined sections. In some aspects, the two or more inclined or declined sections are adjacent each other. In some other aspects, a substantially horizontal section is intermediate the two or more inclined or declined sections. In some aspects, the first and second inclined or declined sections may have different angles of incline or decline. In some aspects, the first section is an incline and the second section is a decline.

In certain aspects of the present invention, each arbor member generally defines a fluid inlet, an internal fluid channel, and a plurality of spray outlets. Each spray outlet generally defines a spray aperture to which is mounted a nozzle assembly. In certain aspects, the nozzle assembly comprises a spray nozzle having a desired spray pattern and spray rate that can be attached to the spray aperture. In one representative aspect, each spray nozzle can be configured for optimal spray performance at operating conditions including a fluid flow rate between about 0.035 gpm and about 2 gpm, more preferably between about 0.1 gpm and about 1.75 gpm, fluid pressures of between about 15 psi and about 100 psi, more preferably between about 20 psi and about 80 psi, more preferably between about 20 psi to about 50 psi, and spray coverage angles of between about 5° and about 90°, more preferably of between about 10° and about 90°, and in some aspects between about 25° and about 75°.

In certain aspects the spray aperture can comprise a threaded connection to provide for rotatable connection of each nozzle assembly to the corresponding spray aperture. Alternatively, spray aperture can comprise a quick-connect style fitting to allow for quick and easy attachment and replacement of the corresponding nozzle assembly. Still in other embodiments, each nozzle assembly can be permanently attached to the corresponding spray aperture, for example, by welding or soldering wherein individual nozzle tips can be replaced to adjust or otherwise repair the nozzle assembly.

In some aspects of the present invention, the spray fluid comprises a chemical intervention solution comprising at least one peroxycarboxylic acid having between about 2 to 12 carbon atoms, and in some aspects comprises peroxyacetic acid. In some aspects, the peroxycarboxylic acid is an equilibrium peroxycarboxylic acid solution, while in some other aspects the peroxycarboxylic acid is a pH modified peroxycarboxylic acid solution. In some aspects, the intervention solution is between about 10 ppm and about 5000 ppm, in some aspects between about 100 ppm and about 2500 ppm, in some aspects between about 250 ppm and about 1500 ppm, in some aspects between about 300 ppm and about 1000 ppm, in some other aspects between about 350 ppm and about 750 ppm, in some aspects between about 10 ppm and 300 ppm, in some aspects between about 25 ppm and about 100 ppm, in some other aspects between about 50 ppm and about 500 ppm.

In some aspects, the equilibrium peroxycarboxylic acid has a pH above about 3.0 and below about 7.0, in certain aspects a pH range of about 3.5 to about 5.5, and in some other aspects a pH range of about 3.5 to about 5.0. In certain preferred aspects of the present invention, the equilibrium peroxycarboxylic acid comprises peroxyacetic acid.

In some aspects, the intervention solution comprises a pH modified peroxycarboxylic acid. In some aspects, the pH modified peroxycarboxylic acid has a pH above about 7.0 and below about 10.0, in certain aspects a pH range of about 7.0 to about 9.5, and in some other aspects a pH range of about 7.5 to about 9.0. In certain preferred aspects of the present invention, the pH modified peroxycarboxylic acid comprises peroxyacetic acid.

In certain aspects of the present invention, the pH modified peroxycarboxylic acid is prepared using at least one buffering agent, said at least one buffering agent chosen from sodium hydroxide, potassium hydroxide, sodium salts of carbonic acid, potassium salts of carbonic acid, phosphoric acid, silicic acid and combinations thereof.

In some aspects, the interventional solution can be provided at conventional water supply temperatures up to about ambient temperature. For example, water from well or municipal sources can be supplied at temperatures from about 50° F. to about ambient temperatures.

In some aspects, the peroxycarboxylic acid solution is chosen from peroxyformic, peroxypropionic, peroxyacetic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxymaleic, peroxyascorbic, peroxyhydroxyacetic, peroxyoxalic, peroxymalonic, peroxysuccinic, peroxyglutaric, peroxyadipic, peroxypimelic, peroxysubric, peroxycitric acid, and mixtures thereof. In some aspects, the peroxycarboxylic acid solution is peroxyacetic acid and peroxylactic acid, in some aspects peroxyacetic acid, and in some other aspects peroxylactic acid.

In some aspects, the processing liquid comprises a chemical intervention solution such as, for example, chlorine, bromine, cetylpyridinium chloride (CPC), an organic acid, a peroxycarboxylic acid, trisodium phosphate, acidified sodium chlorite, and chlorine dioxide, other appropriate interventional solutions and combinations thereof.

In some aspects, the bottom drip pan of the housing structure is configured to capture the antimicrobial solution sprayed out of the spray nozzles, which either does not contact the poultry carcass or of which drips from the poultry carcass before leaving the housing structure. In some aspects, the captured antimicrobial solution captured in the bottom drip pan is transferred to another poultry processing step. In some aspects, the antimicrobial solution captured in the bottom drip pan is fed to a downstream poultry processing section, such as a dip tank step prior to the spray cabinet step. In some aspects, the antimicrobial solution captured in the bottom drip pan contains a lower organic load than the poultry processing step to which it is transferred.

The above summary of the various representative embodiments of the invention is not intended to describe each illustrated embodiment or every implementation of the invention. Rather, the embodiments are chosen and described so that others skilled in the art can appreciate and understand the principles and practices of the invention.

The above summary is not intended to describe each illustrated embodiment or every implementation of the subject matter hereof. The figures and the detailed description that follow more particularly exemplify various embodiments.

BRIEF DESCRIPTION OF THE DRAWINGS

The present invention can be better understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Referring generally to FIGS. 1-2 and 4-6, a carcass spray cabinet 10 of the present invention generally comprises a housing 20 having a pair of opposed side walls 22a, 22b a cabinet entrance 24 and a cabinet exit 26 defining a cabinet interior. The housing 20 also generally has a top portion 27 and a bottom drip pan 28. The housing also has at least one inclined or declined sections 30. The inclined section 30a having an inclined slope in the direction from the cabinet entrance 24 to the cabinet exit 26. The declined section 30b having a declined slope in the direction from the cabinet entrance 24 to the cabinet exit 26. In some aspects, one or both of the side walls 22a, 22b can be clear to allow an observer to view the carcass spray cabinet interior.

Figure 3:
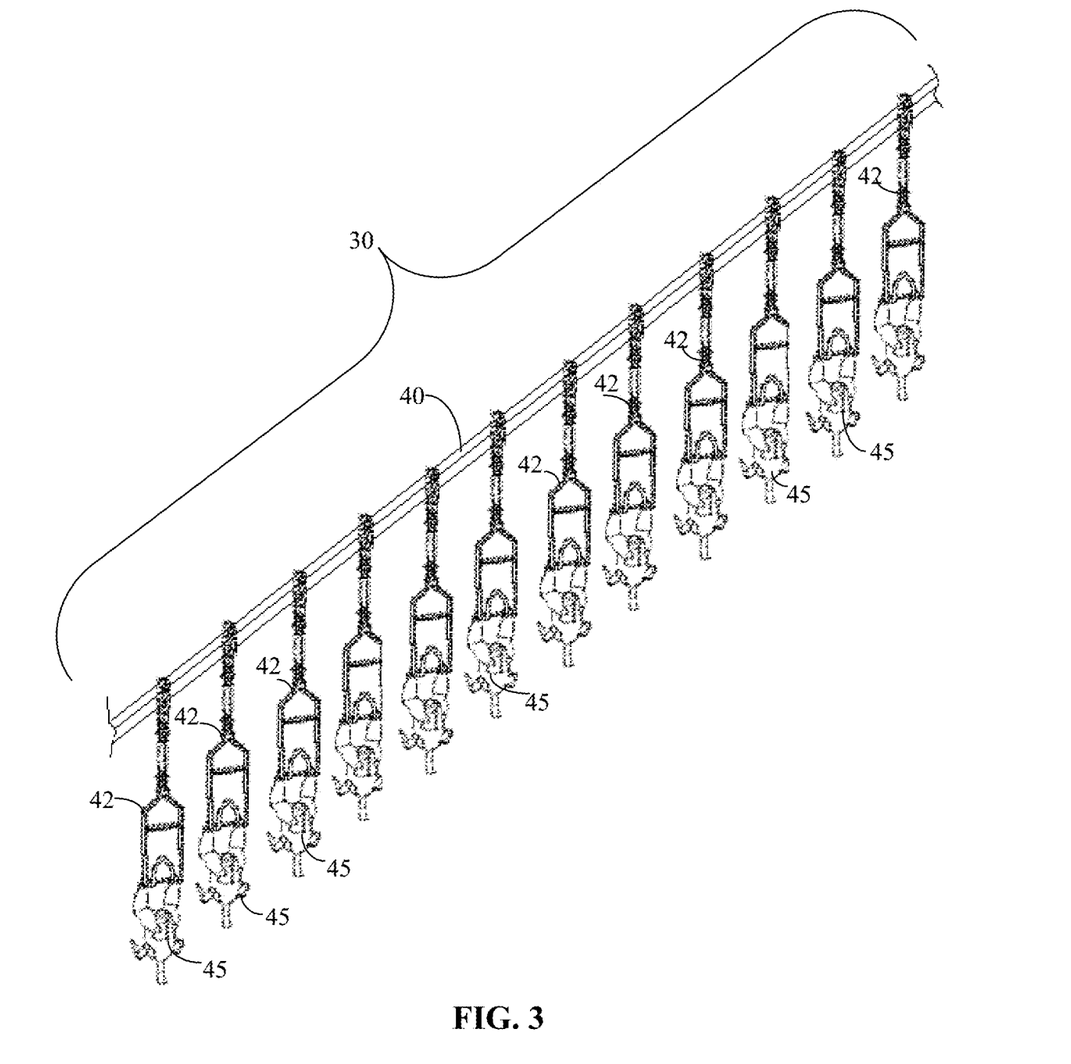
FIG. 3 is a side view of a conveyor of shackled poultry carcasses proximate an inclined or declined section of the carcass spray cabinet of FIG. 1A illustrating the wing-area of adjacent poultry carcasses being offset in a horizontal direction for optimal antimicrobial spray proximate the wing-area of each poultry carcass.

Generally, an overhead conveyor 30 has at least a portion located within the carcass spray cabinet 10 proximate the top portion 27 and operates in a direction from the cabinet entrance 24 to the cabinet exit 26. The conveyor 30 typically includes a plurality of suspended shackles 32 from which whole poultry carcasses 50 are shackled and hang towards the bottom drip pan 28. The conveyor 30 and respective shackles 32 are configured to follow the contour of the housing 20, including any horizontal sections and inclined or declined slopes of the at least one inclined or declined sections 30, such as illustrated in FIG. 3. The inclined or declined sections 30, as illustrated in FIG. 3, offset the wing-area of adjacent poultry carcasses.

Figure 2A:
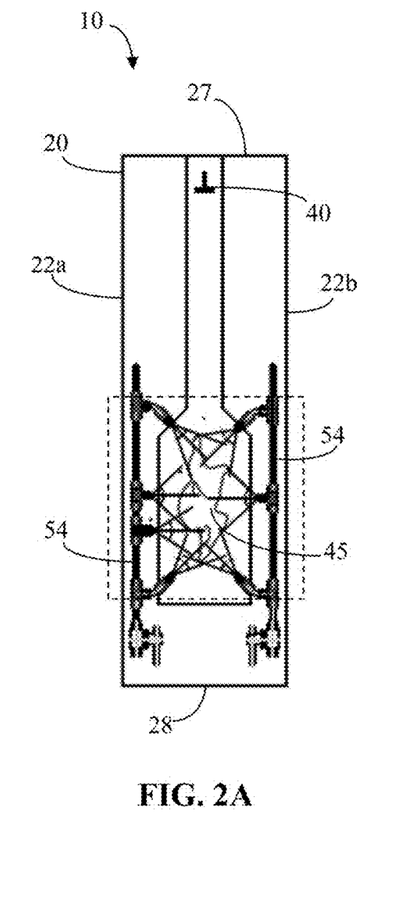
FIG. 2A is a cross-sectional view of one end of the carcass spray cabinet of FIG. 1A illustrating one pair of opposing arbor members with spray nozzles of the spray systems.

Proximately located each of the opposed side walls 22a, 22b is a spray system 50. When viewed from the cabinet entrance 24 or cabinet exit 26, as shown in FIG. 2A, the opposed side walls 22a, 22b each have a corresponding spray system 50 proximately located thereto that are opposed from one another to provide full spray coverage onto the poultry carcass 45 passing through the housing 20.

Each spray system 50 generally comprises a fluid supply 52 in fluid connection with a plurality of arbor members 54. Each arbor member 54 is individually mounted in a spaced apart orientation along the respective side wall 22a, 22b. While FIGS. 1 and 4-6 illustrate one spray system proximate a side wall 22, one of ordinary skill in the art will appreciate that the second spray system is proximate the opposing side wall, such as illustrated in FIG. 2A showing opposing arbor members 54a, 54b with nozzles of a pair of opposing spray systems 50a, 50b. As illustrated, each arbor member 54 is mounted in a generally vertical, spaced apart orientation the length of the housing 20, such that adjacent arbor members 54 reside in an essentially parallel orientation to one another. Alternatively, arbor members 54 can be mounted in a generally horizontal orientation with respect to one another. In yet other embodiments, arbor members 54 may be mounted in a combination of horizontal and vertical orientations. In still yet another embodiment, arbor members 54 may be mounted in a sloped configuration proximate the inclined and/or declined section 30.

Each arbor member 54 generally defines a fluid inlet from the fluid supply 52, an internal fluid channel and a plurality of spray outlets 56. Each spray outlet 56 generally defines a spray aperture to which is mounted a nozzle assembly 60. In a simplest form, the nozzle assembly 60 comprises a spray nozzle 62 having a desired spray pattern and spray rate that can be attached to the spray aperture.

In one representative embodiment, each spray nozzle 62 can be configured for optimal spray performance at operating conditions including a fluid flow rate between about 0.035 gpm and about 2 gpm, more preferably between about 0.1 gpm and about 1.75 gpm, fluid pressures of between about 15 psi and about 100 psi, more preferably between about 20 psi and about 80 psi, more preferably between about 20 psi to about 50 psi, and spray coverage angles of between about 5° and about 90°, more preferably of between about 10° and about 90°, and in some aspects between about 25° and about 75°.

Each arbor member 54 has at least two spray nozzles 62. In some aspects, each arbor member 54 has at least three spray nozzles 62. The number of spray nozzles 62 on each arbor member 54 can range from 2 to 6, more preferably 2 to 5, more preferably 2 to 4, and even more preferably 3 or 4 spray nozzles. Each spray nozzle 62 can be chosen such that each arbor member 54 is configured to provide the desired spray pattern.

In some aspects, each arbor member 54 has at least one wing-spray nozzle 62a that is configured to spray at the wing-area 45a of a poultry carcass 45 hanging from each respective shackle 42. In some other aspects, each arbor member 54 has at least two wing-spray nozzles 62a, 62b that are configured to spray at the wing-area 45a of a poultry carcass 45 hanging from each respective shackle 42. In still some other aspects, at least one first arbor member has at least one wing-spray nozzle 62a and at least one second arbor member 54 has at least two wing-spray nozzles 62a, 62b, each of the wing-spray nozzles 62a, 62b configured to spray at the wing-area 45a of a poultry carcass 45 hanging from each respective shackle 42.

In some aspects, each arbor member 54 in the inclined or declined section 30 has a first wing-spray nozzle 62a and a second wing-spray nozzle 62b, the first wing-spray nozzle 2a configured to spray at the wing-area 45a of a shackled poultry carcass 45 prior to the shackle 42 being proximately located between the opposing arbor members 54 during the conveying process from the entrance 24 to the exit 26 of the housing 20, and the second wing-spray nozzle 62b configured to spray at the wing-area 45a of the shackled poultry carcass 45 after the shackle 42 is proximately located between the opposing arbor members 54 during the conveying process from the entrance 24 to the exit 26 of the housing 30. In some aspects, the first wing-spray nozzle 62a is configured to spray the wing-area 45a of the poultry carcass 45 as it approaches the arbor member 54 and as the poultry carcass is proximately located the arbor member 54, and the second wing-spray nozzle 62b is configured to spray the wing-area 45a of the poultry carcass 45 proximately located the arbor member 54 and as the poultry carcass 45 departs from the arbor member 54.

The first wing-spray nozzle 62a has a first spray pattern and the second wing-spray nozzle 62b has a second spray pattern. In some aspects, the first and second spray patterns are substantially the same. In some other aspects, the first and second spray patterns are different.

In certain aspects, the first spray pattern of a first wing-spray nozzle 62a on a first arbor member 54 does not overlap with a second spray pattern of the second wing-spray nozzle 62b on a second arbor 54 member adjacent the first arbor member 54. In some other aspects, first spray pattern of a first wing-spray nozzle 62a on a first arbor member 54 at least partially overlaps with a second spray pattern of the second wing-spray nozzle 62b on a second arbor 54 member adjacent the first arbor member 54. In some aspects, the top portion of the first spray pattern of the first wing-spray nozzle 62a of a first arbor member 54 overlaps with a bottom portion of the second spray pattern of the second wing-spray nozzle 62b on an adjacent second arbor member 54. In some aspects, the top portion of the first spray pattern of the first wing-spray nozzle 62a of a first arbor member 54 overlaps with a bottom portion of the second spray pattern of the second wing-spray nozzle 62b on an adjacent second arbor member 54 in an amount greater than 0% and up to about 75%, in some aspects greater than about 1% and up to about 50%, in some aspects greater than about 5% and up to about 35%, and in some other preferable aspects greater than about 10% and up to about 25%. As one of ordinary skill in the art will appreciate from the foregoing, the first and second spray patterns of first and second wing-spray nozzles 62a, 62b of adjacent arbor members 54 can be configured to at least partially overlap the wing-area 45a of the poultry carcass 45 during at least a portion of the conveying process between the entrance 24 and the exit 26.

As illustrated in each of FIGS. 1 and 3-5, the inclined or declined section 30 of each housing 10 can comprise a plurality of arbor members 54 that follow the sloped incline or decline, such that the wing-spray nozzles 62a of adjacent arbor members generally have the same sloped incline or decline. FIGS. 1 and 3-5 also illustrate that the wing-spray nozzles 62b of adjacent arbor members generally have the same sloped incline or decline. Because the arbor members 54 are configured to follow the sloped incline or decline, wing-spray nozzles 62a on adjacent arbor members 54 are located in different horizontal planes. Likewise, wing-spray nozzles 62b on adjacent arbor members 54 can also be located in different horizontal planes. The arbor members 54 configured to follow the sloped incline or decline of the inclined or declined section 20 provides an offset of the wing-spray nozzles 62a, 62b on adjacent arbor members 54 to spray the wing-area 45a of the poultry carcasses 45 that are also offset as a result of the inclined or declined section 30.

In some aspects, wing-spray nozzles 62a on opposing arbor members 54 are located in the same horizontal plane. Likewise, wing-spray nozzles 62b on opposing arbor members 54 can also be located in the same horizontal plane.

Each of wing-spray nozzles 62a can be configured to have at least a portion of its respective spray pattern directed towards the entrance 24, and each of second wing-spray nozzles 62b can be configured to have at least a portion of its respective spray pattern directed towards the exit 26. In this configuration, each of the first wing-spray nozzle 62a and the second wing-spray nozzle 62b on a first arbor member 54 are located in different horizontal planes than the first wing-spray nozzle 62a and the second wing-spray nozzle 62b on an adjacent arbor member 54.

In some aspects, the inclined or declined slope of the inclined or declined section 30 has an angle with respect to a horizontal plane that is greater than 0 degrees and less than about 60 degrees, in some aspects greater than about 10 degrees and less than about 45 degrees, in some aspects between about 20 degrees and about 40 degrees, and in some preferable aspects between about 25 degrees and about 35 degrees. In some aspects, the inclined or declined slope of the inclined or declined section 30 of a conveyor 40 having shackles spaced at about four to about eight inches apart, more preferably about six inches apart, has an angle with respect to a horizontal plane that is greater than 0 degrees and less than about 60 degrees, in some aspects greater than about 10 degrees and less than about 45 degrees, in some aspects between about 20 degrees and about 40 degrees, in some preferable aspects between about 25 degrees and about 35 degrees, most preferably about 30 degrees.

Figure 1A:
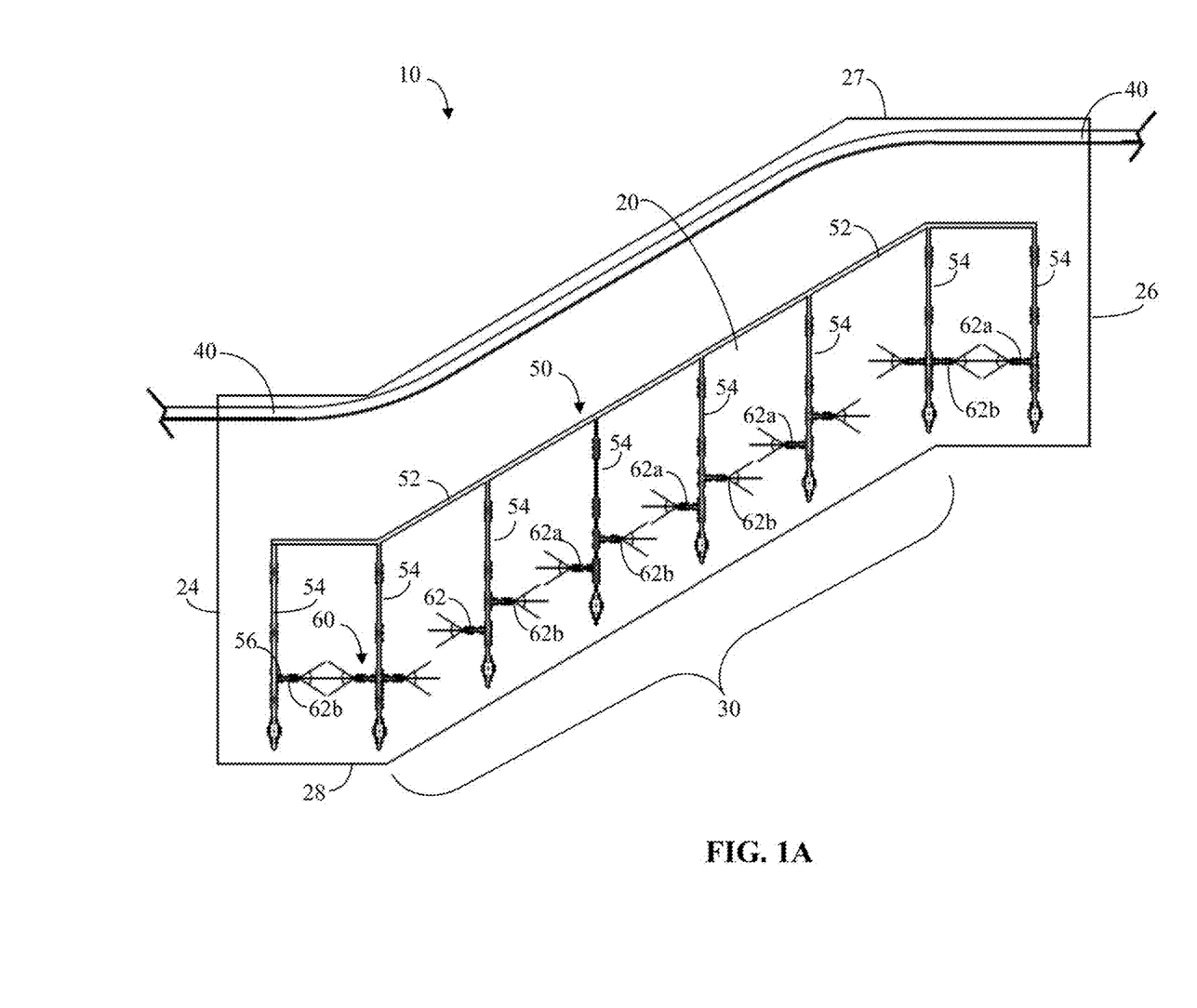
FIG. 1A is a side partial cross-sectional view of a carcass spray cabinet according to certain aspects of the present invention, the housing of the carcass spray cabinet shown in a partial view to illustrate one of the spray systems in the carcass spray cabinet.
Figure 1B:
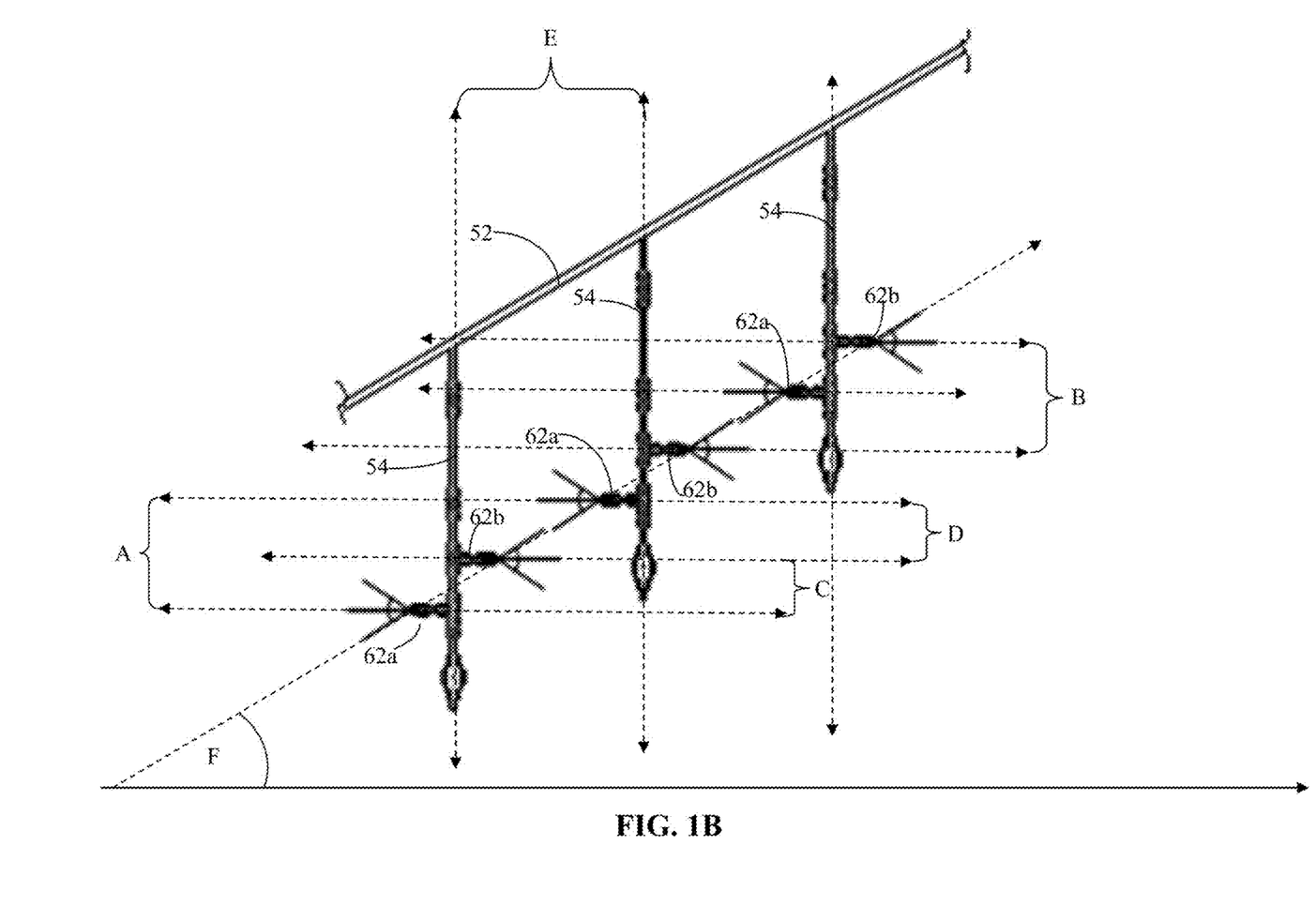
FIG. 1B is a side partial cross-sectional view of three adjacent arbor members proximate the inclined or declined section of the carcass spray cabinet of FIG. 1A illustrating distances and angles of the wing-spray nozzles according to certain aspects of the present invention.

In some aspects, as shown in FIGS. 1A-1B, an angle (F) between the first wing-spray nozzles 62a of adjacent arbor members 54 proximate the inclined or declined section 30 is greater than greater than 0 degrees and less than about 60 degrees, in some aspects greater than about 10 degrees and less than about 45 degrees, in some aspects between about 20 degrees and about 40 degrees, and in some preferable aspects between about 25 degrees and about 35 degrees. In some aspects, the angle between the first wing-spray nozzles 62a of adjacent arbor members 54 proximate the inclined or declined section 30 is substantially the same as the angle of the conveyor 40 proximate the inclined or declined section 30.

In some aspects, as shown in FIGS. 1A-1B, an angle between the second wing-spray nozzles 62b of adjacent arbor members 54 proximate the inclined or declined section 30 is greater than greater than 0 degrees and less than about 60 degrees, in some aspects greater than about 10 degrees and less than about 45 degrees, in some aspects between about 20 degrees and about 40 degrees, and in some preferable aspects between about 25 degrees and about 35 degrees. In some aspects, the angle (F) between the second wing-spray nozzles 62b of adjacent arbor members 54 proximate the inclined or declined section 30 is substantially the same as the angle of the conveyor 40 proximate the inclined or declined section 30. In some aspects, the angle between the second wing-spray nozzles 62b of adjacent arbor members 54 proximate the inclined or declined section 30 is the same as the angle (F) of the first wing-spray nozzles 62a proximate the inclined or declined section 30.

In some aspects, as shown in FIGS. 1A-1B, the wing-spray nozzles 62a, 62b on the same arbor member 54 proximate the inclined or declined section 30 are offset such that there is a horizontal distance (C) between the wing-spray nozzles 62a, 62b on the same arbor member 54 between about 0.50 inches and about 18 inches, in some aspects between about 1 inch and about 14 inches, in some aspects between about 2 inches and about 10 inches, in some aspects between about 3 inches and about 8 inches, and in some other aspects between about 4 inches and about 6 inches. In some aspects, the offset is for a chicken carcass. In some other aspects, the offset is for a poultry carcass chosen from turkey, duck and geese.

In some aspects, as shown in FIGS. 1A-1B, the wing-spray nozzles 62a are located proximately the same location on adjacent arbor members 54, such that the inclined or declined slope between adjacent arbor members 54 provides a horizontal distance (A) between wing-spray nozzles 62a on adjacent arbor members that is greater than 0 inches and up to about 2 feet, in some aspects between about 3 inches and about 20 inches, in some aspects between about 4 inches and about 18 inches, in some aspects between about 5 inches and about 16 inches, and in some other aspects between about 6 inches and about 12 inches. In some aspects, a plane between the wing-spray nozzles 62a of adjacent arbor members 54 has an angle with respect to a horizontal plane that is greater than 0 degrees and less than about 60 degrees, in some aspects greater than about 10 degrees and less than about 45 degrees, in some aspects between about 20 degrees and about 40 degrees, in some preferable aspects between about 25 degrees and about 35 degrees, most preferably about 30 degrees.

In some aspects, the wing-spray nozzles 62b are located proximately the same location on adjacent arbor members 54, such that the inclined or declined slope between adjacent arbor members 54 provides a horizontal distance between wing-spray nozzles 62b on adjacent arbor members is greater than 0 inches and up to about 2 feet, in some aspects between about 3 inches and about 20 inches, in some aspects between about 4 inches and about 18 inches, in some aspects between about 5 inches and about 16 inches, and in some other aspects between about 6 inches and about 12 inches. In some aspects, a plane between the wing-spray nozzles 62b of adjacent arbor members 54 has an angle with respect to a horizontal plane that is greater than 0 degrees and less than about 60 degrees, in some aspects greater than about 10 degrees and less than about 45 degrees, in some aspects between about 20 degrees and about 40 degrees, in some preferable aspects between about 25 degrees and about 35 degrees, most preferably about 30 degrees.

In some aspects, the wing-spray nozzles 62a, 62b are located proximately the same location on adjacent arbor members 54, such that the inclined or declined slope between adjacent arbor members 54 provides a horizontal distance between wing-spray nozzle 62a and 62b on adjacent arbor members 54 that is between 0.50 inches and about 18 inches, in some aspects between about 1 inch and about 14 inches, in some aspects between about 2 inches and about 10 inches, in some aspects between about 3 inches and about 8 inches, and in some other aspects between about 4 inches and about 6 inches.

Figure 2B:
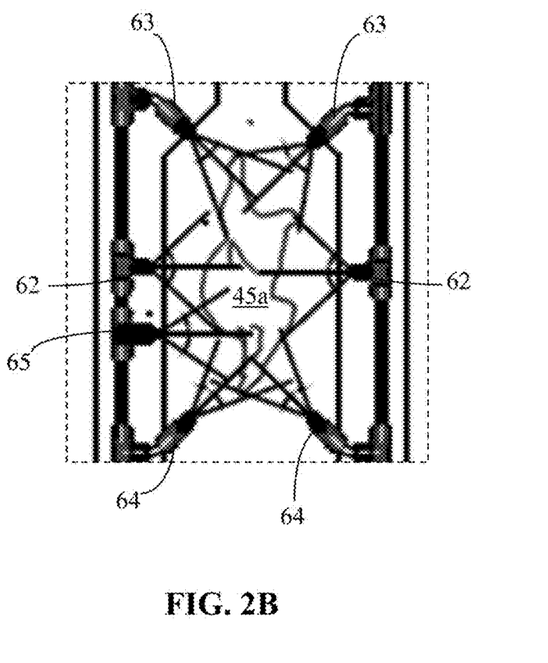
FIG. 2B is a cross-sectional view of the carcass spray cabinet of the dotted box portion of FIG. 2A illustrating the spray nozzles on one pair of opposing arbor members of the spray systems, including the wing-area spray nozzles proximate the wing-area of the poultry carcass.

Besides the wing-spray nozzles 62a, 62b on each arbor member 54, each arbor member 54 may also have a top spray nozzle 63 configured to spray toward the upper portion of the hanging poultry carcass 45 and/or a bottom spray nozzle 64 configured to spray toward the bottom portion of the hanging poultry carcass 45. The wing-spray nozzles 62a, 62b are preferably located between the top spray nozzle 63 and the bottom spray nozzle 64 and configured to spray toward the wing-area 45a of the hanging poultry carcass 45. As shown in FIGS. 2A and 2B, the top spray nozzle 63 can be downwardly directed, the bottom spray nozzle 64 upwardly directed, and the wing-spray nozzles 62 generally horizontally directed. At least one of the opposing arbor members 54 can also have a cavity-spray nozzle 65 configured toward the cavity section of the hanging poultry carcass 45. The cavity-spray nozzle 65 is generally located between the top spray nozzle 63 and the bottom spray nozzle 64 and generally horizontally directed.

As shown in FIGS. 2A-2B, opposing arbor members 54 proximate the inclined or declined section 30 can be spaced apart from each other a distance, the distance between about 6 inches and about 3 feet, in some aspects between about 9 inches and about 2.5 feet, and in some preferable aspects between about 1 foot and about 2 feet.

As shown in FIGS. 1A-1B, adjacent arbor members 54 proximate the inclined or declined section 30 can be spaced apart from each other a distance (E) between about 6 inches and about 5 feet, in some aspects between about 9 inches and about 4 feet, and in some preferable aspects between about 12 inches and about 2 feet. In some aspects, the vertical distance between wing-spray nozzles 62a, 62b on adjacent arbor members 54 proximate the inclined or declined section 30 is greater than 2.5 inches up to about 2.5 feet, in some aspects between about 3 inches and about 2 feet, in some aspects between about 4 inches and about 18 inches, in some aspects between about 5 inches and about 15 inches, and in some other aspects between about 6 inches and about 12 inches.

In some aspects, the housing 20 will have an entrance arbor section 24a having at least two adjacent arbor members 54, an inclined or declined arbor section 30 having at least two adjacent arbor members 54, and an exit arbor section 26a having at least two adjacent arbor members 54, the entrance arbor section 24a having at least one wing-spray nozzle 62 on each adjacent arbor member 54 located in approximately the same horizontal plane, the exit arbor section 26a having at least one wing-spray nozzle 62 on each adjacent arbor member 54 located in approximately the same horizontal plane, and the inclined or declined arbor section 30 having at least one wing-spray nozzle 62 on each adjacent arbor member located in a different horizontal plane.

In some aspects, the inclined or declined section 30 has a distance that each respective shackle is conveyed between about 3 feet and about 20 feet, in some aspects between about 3.5 feet and about 15 feet, in some aspects between about 4 feet and about 12 feet, and in some aspects between about 5 feet and about 10 feet.

Figure 4:
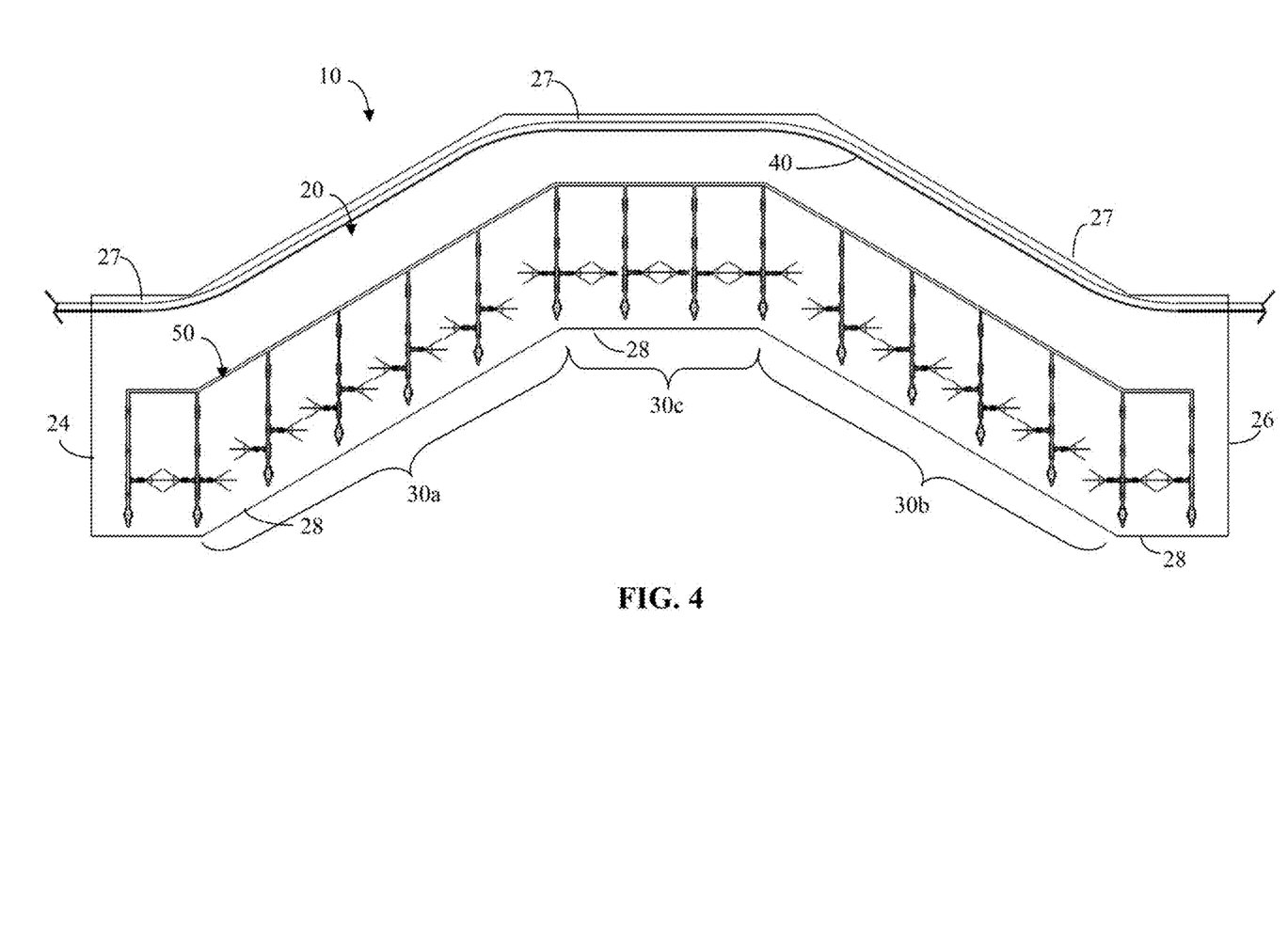
FIG. 4 is a cross-sectional side view of another configuration of the carcass spray cabinet having a horizontal section intermediate an inclined section and declined section according to certain aspects of the present invention, the housing of the carcass spray cabinet shown in a partial view to illustrate one of the spray systems.
Figure 5:
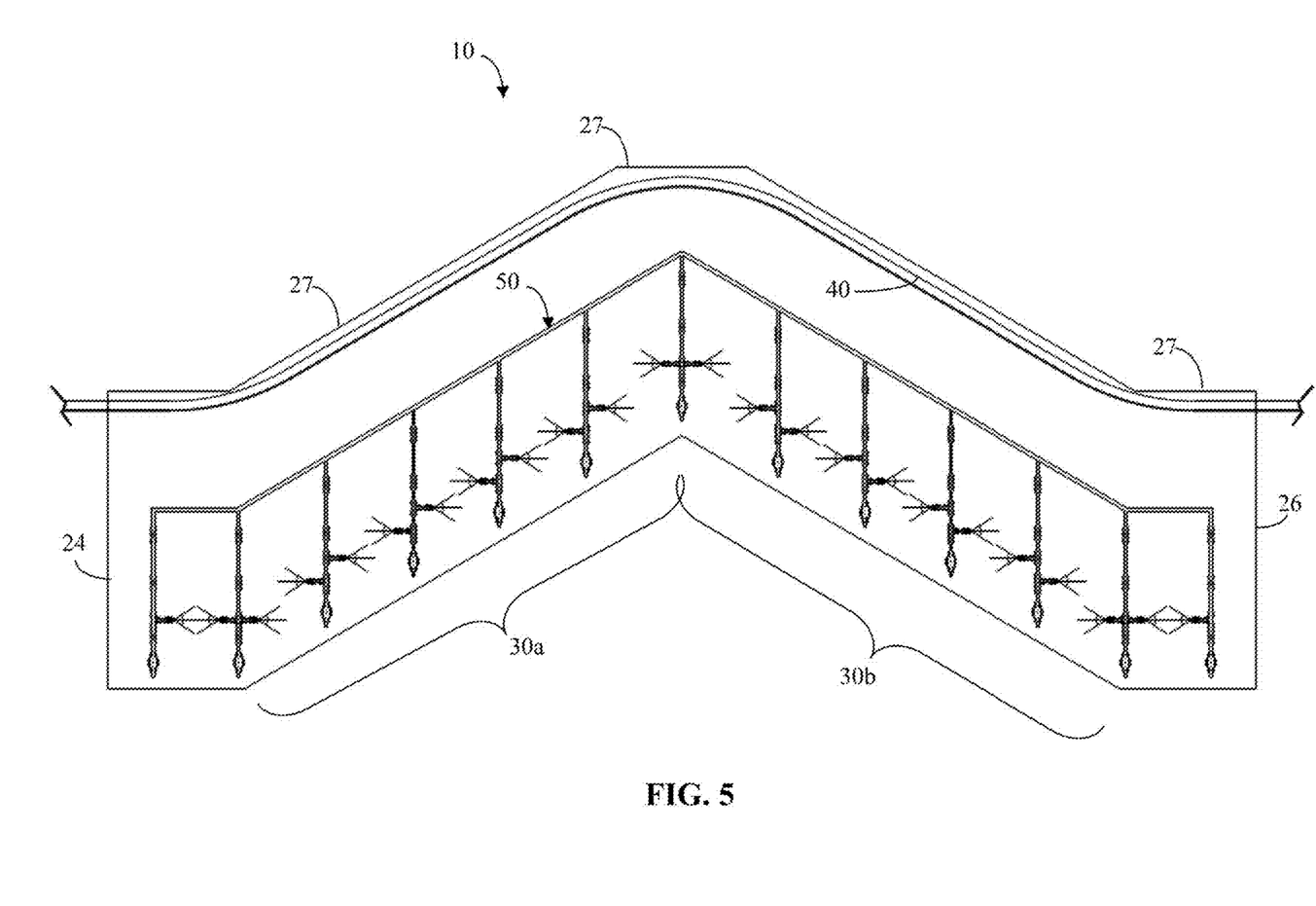
FIG. 5 is a cross-sectional side view of another configuration of the carcass spray cabinet having an inclined section adjacent a declined section according to certain aspects of the present invention, the housing of the carcass spray cabinet shown in a partial view to illustrate one of the spray systems.

The housing 20 of the carcass spray cabinet 10 may be configured to have two or more inclined or declined sections 30. For example, as shown in FIG. 4, the housing 20 has an inclined section 30a and a declined section 30b with an intermediate horizontal section 30c. FIG. 5 illustrates that housing 20 may have an inclined section 30a adjacent a declined section 30b. Other configurations of the inclined or declined sections 30 are also contemplated, such that housing 20 may have two successful inclined sections 30a having different sloped inclines between the entrance 24 and the exit 26. Similarly, housing 20 may have two successful declined sections 30a having different sloped inclines between the entrance 24 and the exit 26. For further exemplary purposes, housing 20 may have at least two successful inclined sections 30a with an intermediate horizontal section 30b between each inclined section 30a. Similarly, housing 20 may have at least two successful declined sections 30b with an intermediate horizontal section 30b between each inclined section 30a. Accordingly, various configurations of inclined or declines sections 30 having various sloped inclines or declines with or without horizontal sections intermediate each inclined or declined section is contemplated herein.

The spray systems 50 are fluidly coupled to a fluid supply comprising a chemical intervention solution that is sprayed through the spray nozzles 62. The chemical intervention solution is preferably an antimicrobial solution used to reduce the microbial load on each poultry carcass 45.

In some aspects, the chemical intervention solution comprises at least one peroxycarboxylic acid having between about 2 to 12 carbon atoms. In some aspects, the chemical intervention is a peroxycarboxylic acid solution chosen from peroxyformic, peroxypropionic, peroxyacetic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxymaleic, peroxyascorbic, peroxyhydroxyacetic, peroxyoxalic, peroxymalonic, peroxysuccinic, peroxyglutaric, peroxyadipic, peroxypimelic, peroxysubric, peroxycitric acid, and mixtures thereof. In some aspects, the peroxycarboxylic acid solution has a concentration of about 10 ppm to about 5000 ppm.

In some aspects, the chemical intervention comprises an antimicrobial agent chosen from a peroxycarboxylic acid, chlorine, bromine, cetylpyridinium chloride (CPC), an organic acid, trisodium phosphate, acidified sodium chlorite, chlorine dioxide, and combinations thereof.

In the event that the chemical intervention solution contains one or more treatment chemicals, these chemicals can be a chemical intervention solution comprising at least one peroxycarboxylic acid having between about 2 to 12 carbon atoms, and in some aspects comprises peroxyacetic acid, peroxylactic acid, or a combination thereof. In some aspects, the peroxycarboxylic acid is an equilibrium peroxycarboxylic acid solution, while in some other aspects the peroxycarboxylic acid is a pH modified peroxycarboxylic acid solution. In some aspects, the intervention solution is between about 10 ppm and about 5000 ppm, in some aspects between about 100 ppm and about 2500 ppm, in some aspects between about 250 ppm and about 1500 ppm, in some aspects between about 300 ppm and about 1000 ppm, in some other aspects between about 350 ppm and about 750 ppm, in some aspects between about 10 ppm and 300 ppm, in some aspects between about 25 ppm and about 100 ppm, in some other aspects between about 50 ppm and about 500 ppm.

In some aspects, the equilibrium peroxycarboxylic acid has a pH above about 3.0 and below about 7.0, in certain aspects a pH range of about 3.5 to about 5.5, and in some other aspects a pH range of about 3.5 to about 5.0. In certain preferred aspects of the present invention, the equilibrium peroxycarboxylic acid comprises peroxyacetic acid, peroxylactic acid, or combinations thereof.

In some aspects, the intervention solution comprises a pH modified peroxycarboxylic acid. In some aspects, the pH modified peroxycarboxylic acid has a pH above about 7.0 and below about 10.0, in certain aspects a pH range of about 7.0 to about 9.5, and in some other aspects a pH range of about 7.5 to about 9.0. In certain preferred aspects of the present invention, the pH modified peroxycarboxylic acid comprises peroxyacetic acid, peroxylactic acid, or combinations thereof.

In certain aspects of the present invention, the pH modified peroxycarboxylic acid is prepared using at least one buffering agent, said at least one buffering agent chosen from sodium hydroxide, potassium hydroxide, sodium salts of carbonic acid, potassium salts of carbonic acid, phosphoric acid, silicic acid and combinations thereof.

Figure 6:
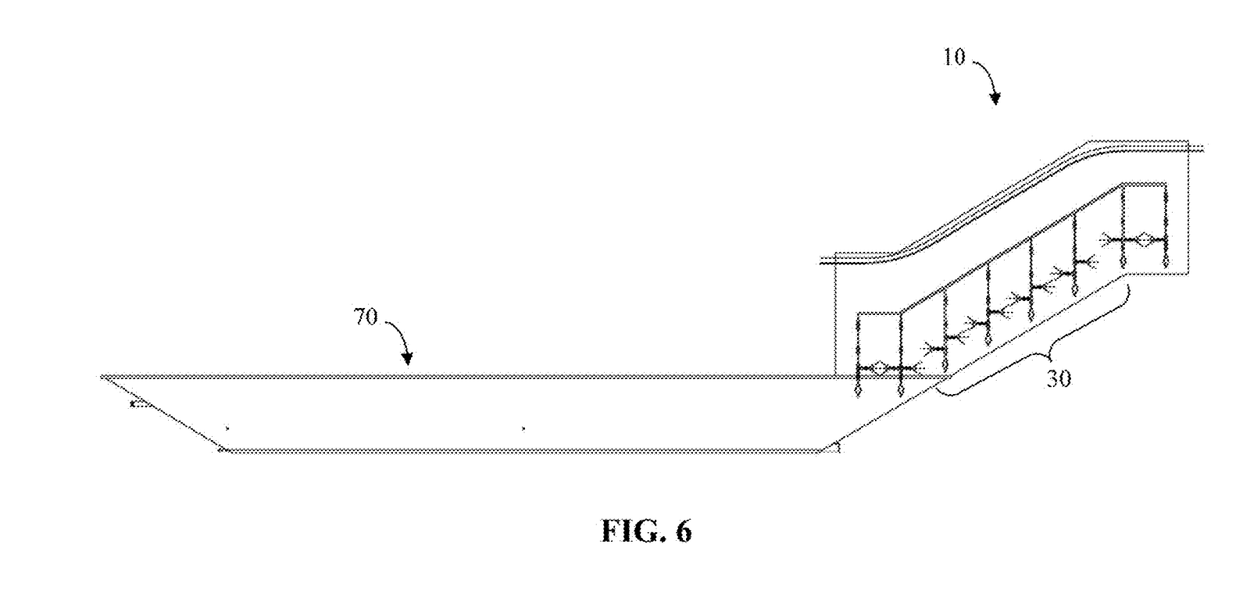
FIG. 6 is a cross-sectional side view of a carcass spray cabinet in-line with a dip tank according to certain aspects of the present invention, the housing of the carcass spray cabinet shown in a partial view to illustrate one of the spray systems.

The chemical intervention solution sprayed out of the spray nozzles 62 within the housing 20 can be collected by the bottom drip pan 28. The collected chemical intervention solution can include overspray that does not contact the poultry carcass, chemical intervention solution that drips from the poultry carcass, chemical intervention spray that condenses on the opposing side walls 22, and the like. The collected chemical intervention solution in the bottom drip pan 28 can be transferred to another poultry processing step and used as at least part of the chemical intervention solution in that other poultry processing step. For instance, the chemical intervention solution collected in the bottom drip pan 28 can be transferred to a dip tank 70, such as shown in FIG. 6, and used as a processing chemical intervention solution in the dip tank 70. In some aspects, the collected chemical intervention solution is transferred to a poultry processing step that is likely to have a higher microbial load on the poultry carcass, such that any microbial load in the collected chemical intervention solution does not cross-contaminate the poultry carcass.

The carcass spray cabinet 10 of the present invention having an inclined or declined section 30 can be used to remove foreign material from the wing-area 45a of a poultry carcass 45 by separating the wing-areas 45a of adjacent shackled poultry carcasses 45. During normal operation, the poultry carcasses 45 can be operably hung from shackles 42 on the conveyor 40. The shackled poultry carcasses can be conveyed on the conveyor 40 from the entrance 24 of the housing 20 to the exit 26. The poultry carcasses 45 are preferably sprayed with a chemical intervention solution within the housing 20 from the spray nozzles 62 on each arbor member 54. As the shackled poultry carcasses 45 are conveyed from the entrance 24 to the exit 26, the conveyor 40 preferably transcends at least one inclined or declined section 30 configured to have arbor member 54 with spray nozzles 62, including the wing spray nozzles 62a, 62b, as previously discussed. At the at least one inclined or declined section 30, the wing-area 45a of adjacent poultry carcasses 45 will be opened up allowing directed sprays of the chemical intervention solution from the spray nozzles 62a, 62b to assist in the removal of foreign materials, reduction of cross-contamination and enhance the reduction of microbial activity on the poultry carcasses 45. In some aspects, the method of removing foreign material includes the removal and/or reduction of microbial loads (e.g., *E. coli, Campylobacter* and/or *Salmonella*).

In some aspects, the poultry carcasses 45 are conveyed from another poultry processing step prior to carcass spray cabinet 10. In some aspects, the poultry carcasses 45 are treated in a dip tank 100 prior to being conveyed through the carcass spray cabinet 10, such as illustrated in FIG. 6.

In some aspects, the poultry carcasses 45 are conveyed to another poultry processing step after being treated in the carcass spray cabinet 10. In some aspects, the poultry carcasses 45 are treated in a dip tank 100 after being treated in the carcass spray cabinet 10.

In some aspects, the poultry carcasses 45 are conveyed from another poultry processing step prior to carcass spray cabinet 10 and then conveyed to another poultry processing step after being treated in the carcass spray cabinet 10. In some aspects, the poultry carcasses 45 are treated in a dip tank 100 before and/or after being treated in the carcass spray cabinet 10.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A carcass spray cabinet, comprising:
   a housing having a pair of oppositely opposed side walls, a first end of the oppositely opposed side walls defining an entrance, a second end of the oppositely opposed side walls defining an exit, wherein the housing has an inclined or declined section located between the entrance and the exit;
   a conveyor having a plurality of shackles, each shackle capable of carrying a carcass, the conveyor configured to convey the plurality of shackles into the entrance and through the inclined or declined section in a direction towards the exit;
   a fluid supply; and
   a pair of oppositely opposed spray systems fluidly coupled to the fluid supply, each oppositely opposed spray system being operably mounted one of the oppositely opposed side walls, each spray system including a plurality of arbor members, wherein each arbor member includes an internal fluid channel having at least one spray outlet and a spray nozzle fluidly coupled to each spray outlet for spraying the fluid supply in a desired spray pattern;
   wherein each of the pair of oppositely opposed spray systems comprises at least two spray arbor sections proximately located at the inclined or declined section, each of the at least two arbor sections comprises at least two adjacent arbor members that are oppositely opposed from at least two other adjacent arbor members such that the conveyor is configured to convey the plurality of shackles between the at least two spray arbor sections at the inclined or declined section offsetting a wing-area of adjacent poultry carcasses hanging from adjacent shackles; and
   wherein each arbor member proximately located the inclined or declined section has at least a first wing-spray nozzle and a second wing-spray nozzle that are configured to spray an antimicrobial solution at the wing-area of each poultry carcass hanging from each respective shackle during a conveying process from the entrance to the exit of the housing.

2. The carcass spray cabinet of claim 1, wherein the housing further comprises a bottom drip pan and a top portion with the conveyor located within the housing structure under the top portion.

3. The carcass spray cabinet of claim 1, wherein each arbor member has a first wing-spray nozzle and a second wing-spray nozzle, the first wing-spray nozzle configured to spray an antimicrobial solution at the wing-area of a poultry carcass prior to the shackle being proximately located between the opposing arbor members during the conveying process from the entrance to the exit of the housing, and the second wing-spray nozzle configured to spray an antimicrobial solution at the wing-area of a poultry carcass after the shackle being proximately located between the opposing arbor members during the conveying process from the entrance to the exit of the housing.

4. The carcass spray cabinet of claim 1, wherein each arbor member has at least a first wing-spray nozzle and a second wing-spray nozzle, the first and second wing-spray nozzles configured to spray an antimicrobial solution at the wing-area of a poultry carcass hanging from the shackle, the first wing-spray nozzle configured to spray the wing-area of the poultry carcass as it approaches the arbor member and as the poultry carcass is proximately located the arbor member, and the second wing-spray nozzle configured to spray the wing-area of the poultry carcass proximately located the arbor member and as the poultry carcass departs from the arbor member.

5. The carcass spray cabinet of claim 1, wherein a first spray pattern of the first wing-spray nozzle on a first arbor member proximately located the inclined or declined section does not overlap with a second spray pattern of the second wing-spray nozzle on a second arbor member adjacent the first arbor member proximately located the inclined or declined section.

6. The carcass spray cabinet claim 1, wherein a first spray pattern of the first wing-spray nozzle on a first arbor member proximately located the inclined or declined section at least partially overlaps with a second spray pattern of the second wing-spray nozzle on a second arbor member adjacent the first arbor member proximately located the inclined or declined section.

7. The carcass spray cabinet of claim 1, wherein the first and second wing-spray nozzles on the same arbor member are located in different horizontal planes.

8. The carcass spray cabinet of claim 1, wherein the first wing-spray nozzle on a first arbor member is located in a different horizontal plane than the first wing-spray nozzle on a second arbor member, wherein the second arbor member proximately located adjacent the first arbor member.

9. The carcass spray cabinet of claim 1, wherein the second wing-spray nozzle on a first arbor member is located in a different horizontal plane than the second wing-spray nozzle on a second arbor member, wherein the second arbor member proximately located adjacent the first arbor member.

10. The carcass spray cabinet of claim 1, wherein each of the pair of oppositely opposed spray systems comprises a first arbor member adjacent a second arbor member proximately located the inclined or declined section, each arbor member having a first wing-spray nozzle configured to have at least a portion of a spray pattern directed towards the entrance and a second wing-spray nozzle configured to have at least a portion of a spray pattern directed towards the exit, wherein the first wing-spray nozzle on the first arbor member, the second wing-spray nozzle on the first arbor member, the first wing-spray nozzle on the second arbor member and the second wing-spray nozzle on the second arbor member, are each located in a different horizontal plane from each other.

11. The carcass spray cabinet of claim 1, wherein a horizontal distance between the first and second wing-spray nozzles on the same arbor member proximately located the inclined or declined section is between 2 inches and about 6 inches.

12. The carcass spray cabinet of claim 1, wherein a first horizontal distance between the first wing-spray nozzles on adjacent arbor members proximately located the inclined or declined section is between about 3 inches and about 18 inches.

13. The carcass spray cabinet of claim 12, wherein a second horizontal distance between the second wing-spray nozzles on adjacent arbor members proximately located the inclined or declined section is between about 3 inches and about 18 inches.

14. The carcass spray cabinet of claim 1, wherein each arbor member proximately located the inclined or declined section has a top spray nozzle configured to spray the antimicrobial solution at a downward direction toward each respective poultry carcass, a bottom spray nozzle configured to spray the antimicrobial solution at an upward direction toward each respective poultry carcass, wherein each of the first and second wing-spray nozzles are proximately located between the top and bottom spray nozzles.

15. The carcass spray cabinet of claim 14, wherein at least one of the opposing arbor members comprises a cavity-spray nozzle proximately located between the top and bottom spray nozzles, the cavity-spray nozzle configured to spray the antimicrobial solution toward the cavity section of each respective poultry carcass.

16. The carcass spray cabinet of claim 1, wherein the inclined or declined section has an angle greater than about 10 degrees and less than about 60 degrees.

17. The carcass spray cabinet of claim 1, wherein each of the oppositely opposed arbor members proximately located the inclined or declined section are located away from each other a distance between about 6 inches and about 3 feet.

18. The carcass spray cabinet of claim 1, wherein adjacent arbor members proximately located the inclined or declined section are located away from each other a distance between about 6 inches and about 5 feet.

19. The carcass spray cabinet of claim 1, wherein a plane between the first wing-spray nozzles of adjacent arbor members relative to a horizontal plane has an angle greater than about 10 degrees and less than about 60 degrees.

20. The carcass spray cabinet of claim 1, wherein a horizontal plane between the second wing-spray nozzles of adjacent arbor members relative to a horizontal plane has an angle greater than about 10 degrees and less than about 60 degrees.

21. The carcass spray cabinet claim 1, wherein the inclined or declined section has a longitudinal distance that each respective shackle is conveyed between about 3 feet and about 20 feet.

22. The carcass spray cabinet of claim 1, wherein each arbor member comprises a fluid inlet, an internal fluid channel, and a plurality of spray outlets, each spray outlet configured to house at least one spray nozzle chosen from the first wing-spray nozzle, the second wing-spray nozzle, a top spray nozzle, a bottom spray nozzle, and a cavity-spray nozzle.

23. The carcass spray cabinet of claim 1, wherein the antimicrobial solution comprises a chemical intervention solution comprising at least one peroxycarboxylic acid having between about 2 to 12 carbon atoms.

24. The carcass spray cabinet of claim 23, wherein the antimicrobial solution is a peroxycarboxylic acid solution present within the fluid supply at a concentration of about 10 ppm to about 5000 ppm chosen from peroxyformic, peroxypropionic, peroxyacetic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxymaleic, peroxyascorbic, peroxyhydroxyacetic, peroxyoxalic, peroxymalonic, peroxysuccinic, peroxyglutaric, peroxyadipic, peroxypimelic, peroxysubric, peroxycitric acid, and mixtures thereof.

* * * * *